May 25, 1937.     B. B. BRANAMAN, SR     2,081,142
WATCH CLEANING MACHINE
Filed March 22, 1935     2 Sheets-Sheet 1
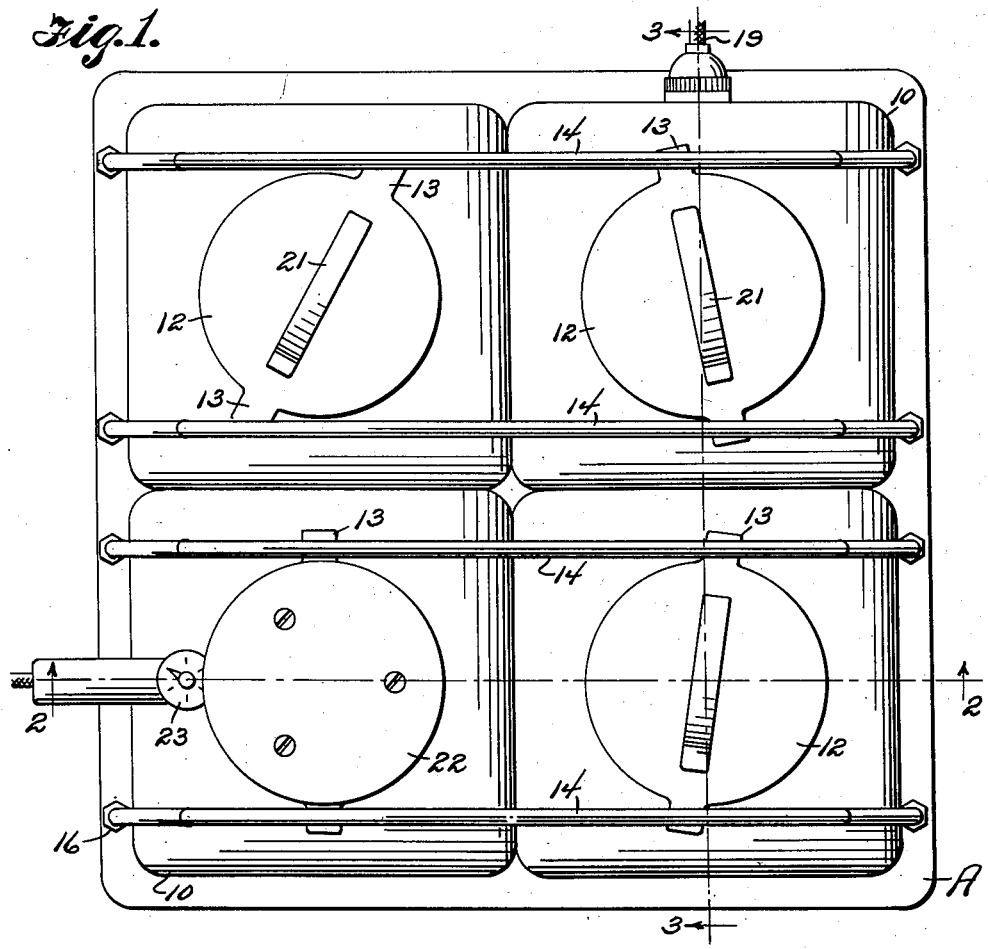
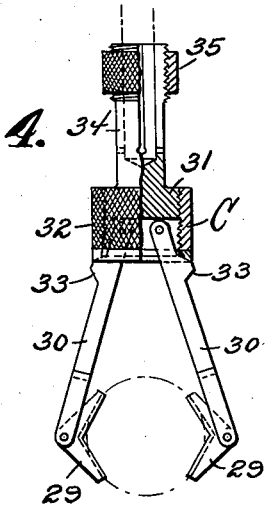
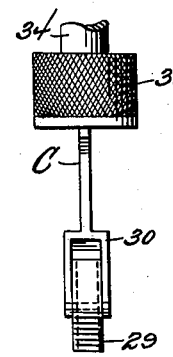
Billy B. Branaman, Sr.
INVENTOR
BY Victor J. Evans & Co.
ATTORNEY May 25, 1937.  B. B. BRANAMAN, SR  2,081,142
WATCH CLEANING MACHINE
Filed March 22, 1935    2 Sheets-Sheet 2
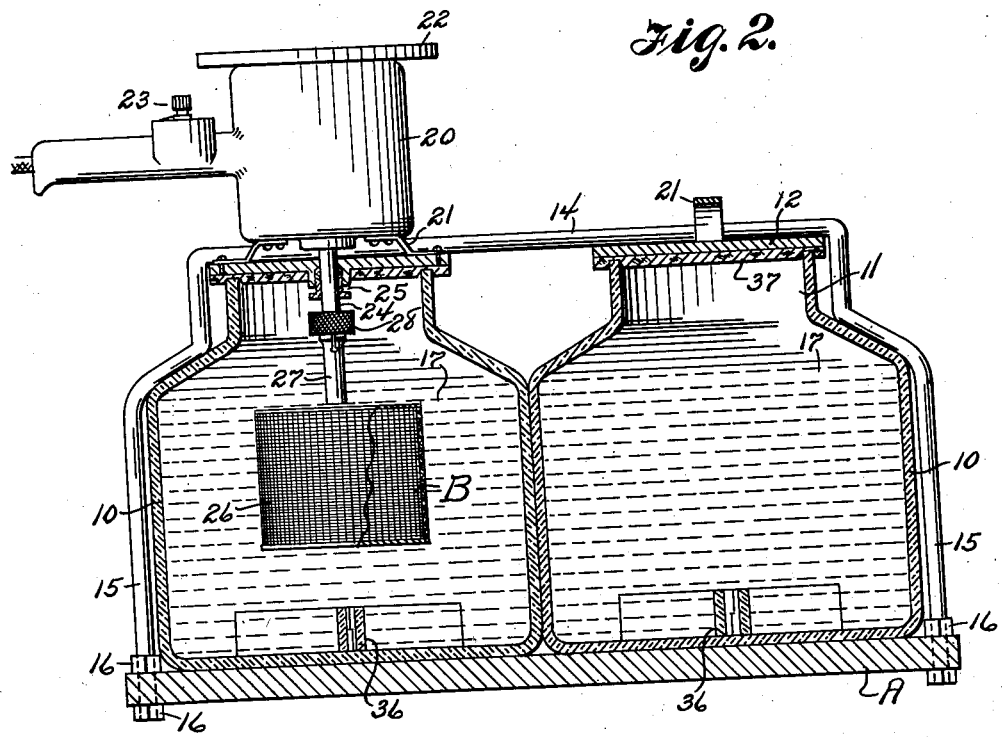

Patented May 25, 1937

2,081,142

UNITED STATES PATENT OFFICE 2,081,142

WATCH CLEANING MACHINE

Billy B. Branaman, Sr., Marysville, Calif.

Application March 22, 1935, Serial No. 12,479

1 Claim. (Cl. 141—1)

The invention relates to a cleaning machine and more especially to jewelry or watch cleaning machines.

The primary object of the invention is the provision of a machine of this character, wherein arranged upon a base is a plurality of jars or containers for cleaning fluids and in association with one of these jars is an electric heater while associated with another jar is an electric motor, this being mounted in a novel manner so that upon opening of the jar the motor can be brought to rest in a supporting position, there being selective devices attachable to the motor for service in the cleaning process, particularly for cleaning watches or the like.

Another object of the invention is the provision of a machine of this character, wherein in the bottom of the jars or containers is a means for assuring the settling of foreign matter or sediment so that the cleaning fluid within each jar or container will be clear thereof as on agitation of the fluid the sediment will be trapped and practically motionless.

A further object of the invention is the provision of a machine of this character, which is comparatively simple in construction, convenient and efficient in operation, readily portable, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a top plan view of the machine constructed in accordance with the invention.

Figure 2 is a sectional view on the line 2—2 of Figure 1 looking in the direction of the arrows.

Figure 3 is a sectional view on the line 3—3 of Figure 1 looking in the direction of the arrows.

Figure 4 is an elevation partly broken away of one of the devices used with the electric motor.

Figure 5 is an edge view thereof.

Similar reference characters indicate corresponding parts throughout the several views in the drawings.

Referring to the drawings in detail, the machine comprises a base A of flat board-like form and of a size to permit the mounting thereon of a series of jars or containers 10, these being made preferably from glass and having contracted upper open mouth portions 11, the said jars or containers being of a shape to be in contact with each other when upon the base. Closing the mouth portions 11 of the jars or containers 10 are removable caps or covers 12, these having diametrically opposite ears 13 for engaging beneath stationary yokes or frames 14 having the upright portions 15 pass through the base A and made secure by jam nuts 16 thereon. The caps or covers 12 are turned for releasing the ears 13 thereof from the yokes or frames 14 for the freeing of said caps or covers. On removal of each cap or cover access to the fluid content 17 within the selected jar can be had. When the cap is turned to bring its ears beneath the yokes 14 the jars 10 are held rigidly on the base A and the frictional contact afforded between the ears and yokes effectively clamps the caps on the mouths of the jars to protect and prevent spilling of the contents of the same.

Built into the lowermost portion of one of the jars is an electric heating unit 18, the current source being supplied thereto by the electric cord or cable 19.

Upon one of the caps or covers 12 is fixedly carried an electric motor 20 it being supported on brackets 21' in substitute for a bail handle 21 which is common to each of the other caps or covers 12, while it is preferable to have the motor 20 made fast to these brackets 21' at one end of the said motor, the other end carrying a disk-like rest piece 22. In the circuit including this motor is included a control switch 23. The power shaft 24 of the motor 20 is passed through a suitable bearing or gland 25 provided on the cap or cover 12 carrying said motor so that the said shaft will protrude downwardly into the jar or container for a distance.

Separably engageable with the shaft 24 are the devices or tools B and C, respectively. The device or tool B is in the form of a reticulated basket 26 for the reception of articles to be cleaned by the fluid within the jar or container and the stem 27 of this basket is fitted with a socketed clamp 28 for detachable coupling of the stem with the shaft 24 of the motor.

The device C comprises a pair of swinging angle jaws 29, these being centrally pivoted to levers 30 which latter are also pivoted to a head 31 which has threaded thereon a threaded adjustable sleeve 32 which plays upon lug abutments 33 on the levers 30 so that in this manner adjustment of the jaws is had. The jaws 29 are designed for engaging a watch or the like mechanism frame. The head 31 is formed with the socketed stem 34 carrying a clamp 35 for the detachable coupling of the stem 34 with the shaft 24 of the motor so that a watch mechanism or the like can be submerged in the fluid and suspended therein within one of the jars or containers for cleaning purposes.

Arranged within each jar or container 10 and upon its bottom is a substantially X-shaped baffle member 36 functioning as a sediment arrester so as to render sediment and other foreign matter still within the fluid 17 and particularly when the latter is subjected to agitation so that this fluid will be practically clear and clean in the use thereof.

Each cap or cover at the fitting side thereof with the jar or container carries a cork 37 to assure a fluid tight closure.

What is claimed is:

In a watch cleaning machine, a plurality of wide mouth jars for cleaning fluid, a base for supporting the jars side by side, parallel yokes arranged over the jars and at respective opposed sides of the mouths thereof and having their arms in contact with the outer sides of the said jars and adjustably secured to the base, a disk shaped cap for the mouth of each jar, an electric motor on one of the caps and having an armature shaft journaled through said cap for entrance into the jar, means on the caps for the latching of the latter by said yokes, and arched bails on certain of said caps.

BILLY B. BRANAMAN, Sr.